United States Patent [19]

Itoh

[11] 4,395,092
[45] Jul. 26, 1983

[54] COMPACT TELEPHOTO ZOOM LENS

[75] Inventor: Takayuki Itoh, Tokyo, Japan

[73] Assignee: Asahi Kogaku Kogyo Kabushiki Kaisha, Tokyo, Japan

[21] Appl. No.: 240,421

[22] Filed: Mar. 4, 1981

[30] Foreign Application Priority Data

Mar. 10, 1980 [JP] Japan .................................. 55-30037

[51] Int. Cl.³ .............................................. G02B 15/14
[52] U.S. Cl. ...................................................... 350/427
[58] Field of Search ........................................ 350/427

[56] References Cited

U.S. PATENT DOCUMENTS 3,000,259  9/1961  Turula et al. ...................... 350/427
3,074,317  1/1963  Cox et al. .......................... 350/427

Primary Examiner—John K. Corbin
Assistant Examiner—Rebecca D. Gass
Attorney, Agent, or Firm—Sughrue, Mion, Zinn, Macpeak & Seas

[57] ABSTRACT

A compact telephoto zoom lens is composed of twelve lenses grouped into nine lens groups. These include, from the object side, a variator system including a first lens group functioning as a focusing group having a positive focal length, a second lens group functioning as a main variator having a negative focal length, a third lens group functioning as a compensator for maintaining an image plane constant which has a positive focal length, and a relay lens system. The first lens group includes a positive meniscus lens convex on the object side and a positive cemented lens composed of a negative meniscus lens convex on the object side and a positive lens. The second lens group includes a negative lens whose lens concave surfaces confront one another and a negative cemented lens composed of a biconcave and a positive lens. The third lens group includes a positive cemented lens composed of a biconvex lens and a negative meniscus lens while the relay lens system includes first and second fourth lens groups.

2 Claims, 4 Drawing Figures

COMPACT TELEPHOTO ZOOM LENS

BACKGROUND OF THE INVENTION

The present invention relates to a telephoto zoom lens having a half viewing angle of 15° to 6° and a zoom ratio of 2.5. This type of zoom lens is very popular and well known among photographic lenses for 35 mm cameras.

The prior art zoom lenses of this type are divided into the following types.

(i) A first lens type in which, although the focal length at the telephoto end to the length from the ratio of the front end of the lens to the focal plane, that is, the telephoto ratio, is greater than 1, the number of the structural lens elements is about twelve which is small.

(ii) A second lens type in which the telephoto ratio is greater than 1 and the number of lens elements is about fifteen.

(iii) A third lens type in which, although the telephoto ratio is smaller than 1, the number of the structural lens elements is greater than fifteen.

(iv) A fourth lens type in which the telephoto ratio is smaller than 1 and the number of lens elements is small but the zoom ratio is smaller than two or approximately two.

(v) A fifth lens type in which the telephoto ratio is smaller than 1, the number of lens elements is small and the zoom ratio is approximately 2.5 but the curvature of field is remarkably varied in response to variation of the focal length.

SUMMARY OF THE INVENTION

The present invention provides a high performance compact zoom lens in which twelve lenses are grouped into nine lens groups. This number of lens is inherently required to provide good lens performance and compactness for a zoom lens of this general type. The invention provides a lens construction within these general constraints which has a significantly improved performance. The zoom lens of the present invention is designed so that although compact, sufficient central and peripheral thicknesses are provided for each lens as is a sufficient spacing between adjacent lenses. With the zoom lens of the invention, the number of mechanical parts of a lens barrel of the lens can be decreased and the zoom lens can be economically manufactured.

According to the present invention, although the telephoto ratio is smaller than 1, that is, the lens is compact and the required twelve lens elements are in nine lens groups, the curvature of field in small, the lens is capable of high performance, and the lens construction is reasonably well balanced.

DESCRIPTION OF THE PREFERRED EMBODIMENTS

Figure 1:
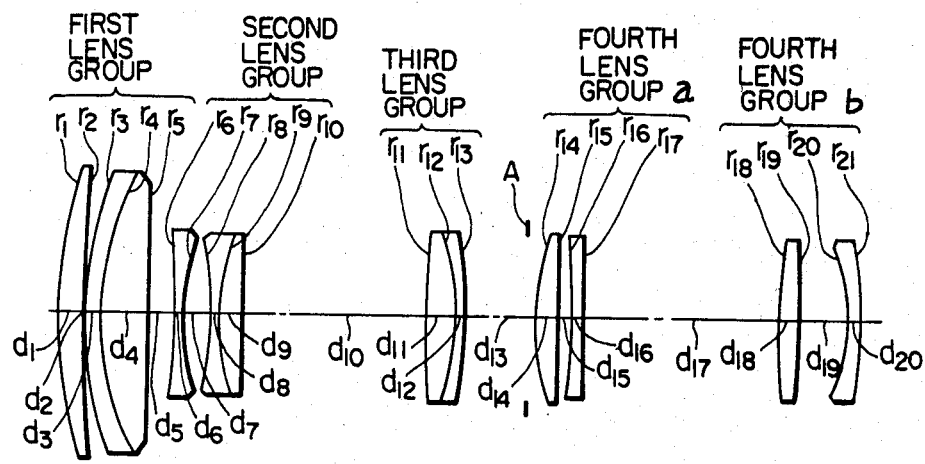
FIG. 1 shows a zoom lens constructed according to the present invention at the wide angle end.
Figure 2A:
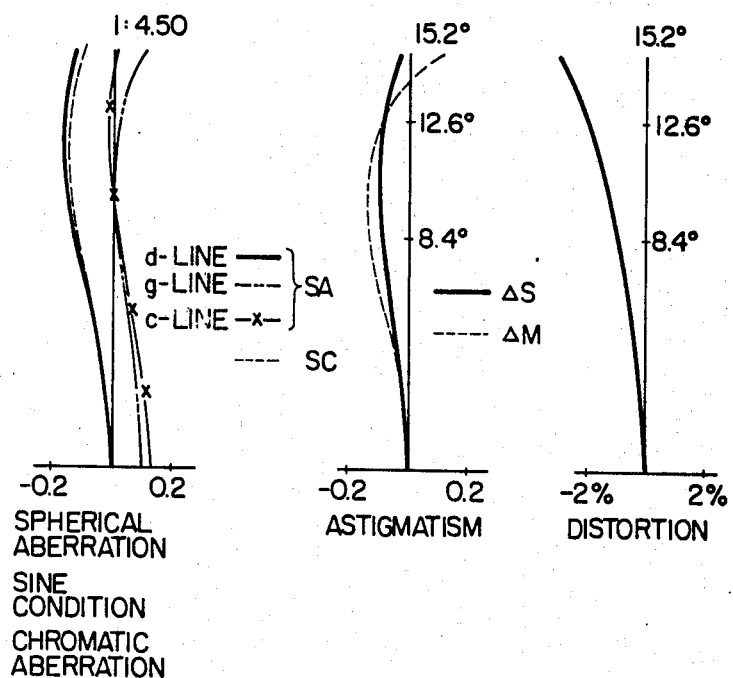
FIGS. 2A to 2C show various aberration curves of the lens of FIG. 1 wherein FIG. 2A relates to the wide angle end, FIG. 2B to the medium focal length, and FIG. 2C to the telephoto focal length.
Figure 2B:
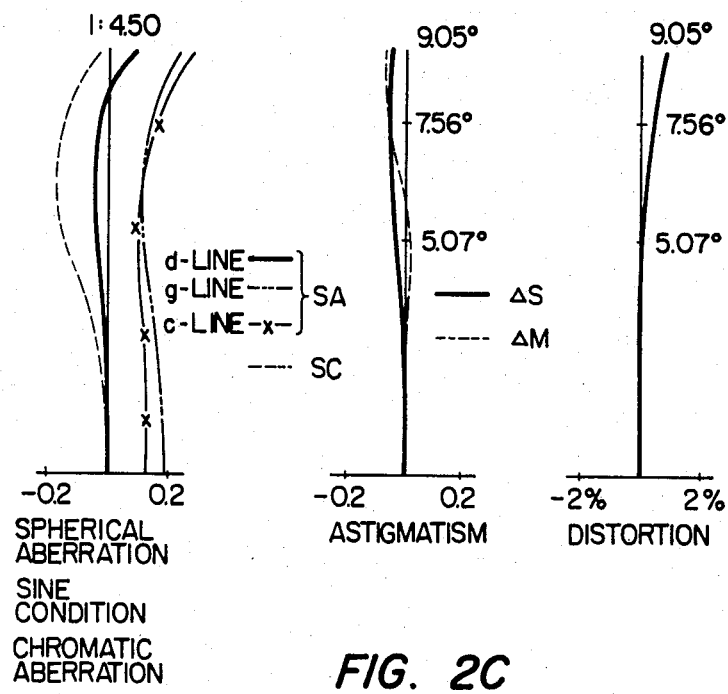
Figure 2C:
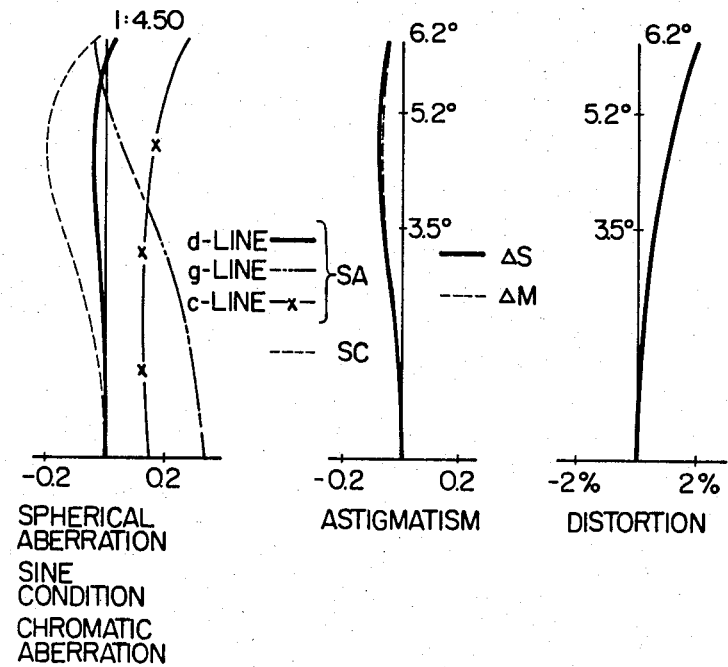

The lens construction according to the present invention will now be described.

According to the present invention, a compact telephoto zoom lens is composed, in order from the object side, of a variator system including a first lens group functioning as a focusing group having a positive focal length, a second lens group functioning as a main variator having a negative focal length, a third lens group functioning as a compensator for maintaining the image plane constant having a positive focal length, and a relay lens system. The first lens group includes a positive meniscus lens convex on the object side and a positive cemented lens composed of a negative meniscus lens convex on the object side and a positive lens. The second lens group includes a negative lens whose lens concave surfaces confront each other and a negative cemented lens composed of a biconcave lens and a positive lens. The third lens group includes a positive cemented lens composed of a biconvex lens and a negative meniscus lens. The relay lens system includes a fourth lens group a composed of a positive lens having a stronger convex surface on the object side and a biconcave negative lens and a fourth lens group b composed of a biconvex positive lens and a negative meniscus lens having a stronger concave surface on the object side. The fourth lens group b is disposed a predetermined distance from said fourth lens group a. The composite zoom lens of the invention satisfies the following conditions:

$$0.5 < \frac{f_{min}}{f_I} < 1.0, \quad (1)$$

$$-1.5 < \frac{f_{min}}{f_{I\sim II}} < -1.0, \quad (2)$$

$$-0.25 < \frac{f_{min}}{f_{I\sim III}} < 0.15, \quad (3)$$

$$0.8 < \frac{f_{min}}{f_{I\sim IVa}} < 1.25, \quad (4)$$

$$1.5 < \frac{f_{min}}{f_{I\sim IVb1}} < 2.3, \quad (5)$$

$$1.60 < \frac{n_{II1} + n_{II2}}{2}, \quad (6)$$

$$0.35 < \frac{r_{IVa1}}{f_{min}} < 1.0, \quad (7)$$

$$0.25 < \frac{l_{IVaIVb}}{f_{min}} < 0.6, \quad (8)$$

$$0.05 < \frac{l_{IVb2}}{f_{min}} < 0.2, \quad (9)$$

$$0.25 < \frac{|r_{IVb3}|}{f_{min}} < 0.7 \ (r_{IVb3} < 0), \text{ and} \quad (10)$$

$$1.70 < n_{IVb2}, \quad (11)$$

where:
$f_{min}$ is the overall focal length at the wide angle end;
$f_I$ is the focal length of the first lens group;
$f_{I\sim II}$ is the resultant focal length of the first and second lens group at the wide angle end;
$f_{I\sim III}$ is the resultant focal length of the first, second and third lens groups at the wide angle end;
$f_{I\sim IVa}$ is the resultant focal length from the first lens group to the fourth lens group a at the wide angle end;

$f_{I\sim IVb1}$ is the resultant focal length from the first lens group to the positive lens of the fourth lens group b at the wide angle end;

$n_{II1}$ is the refractive index of the first negative lens of the second lens group at the d-line;

$n_{II2}$ is the refractive index of the second negative lens of the second lens group at the d-line;

$r_{IVa1}$ is the radius of curvature of the first lens surface of the fourth lens group a;

$l_{IVaIVb}$ is the distance between the fourth lens groups a and b;

$l_{IVb2}$ is the distance between the positive lens and the negative meniscus lens of the fourth lens group b;

$r_{IVb3}$ is the radius of curvature of the first lens surface of the negative meniscus lens of the fourth lens group b; and $n_{IVb2}$ is the refractive index of the negative meniscus lens of the fourth lens group b at the d-line.

These conditions will be explained in detail.

Conditions (1), (2), (3), (4) and (5) relate the power distributions of the noted lenses. Above the upper limit of Condition (1), although suitable for miniaturization, the power of the first group is excessive. This results in an increase of spherical aberration accompanying a variation of the focal length. Inversely, below the lower limit thereof, although suitable for aberration compensation, the amount of movement of the lenses required for focusing is unacceptably high. This leads to an increase of the overall length and diameter of the first lens.

If the lower limit of Condition (2) is exceeded, although suitable for miniaturization, the power of the second lens group is excessive. This results in an increase of variation of curvature of field. If the upper limit is exceeded, although suitable for aberration compensation, the variator function is reduced so that the needed lens movement amount is increased during zooming operations. This also leads to an elongation of the overall zoom lens system.

The subsystem composed of the first to third lenses is similar to an afocal system. However, above the upper limit of Condition (3), the lens power of the third lens group is excessive. As a result, it is impossible to compensate aberrations with two lens elements forming a single lens group. When the lower limit thereof is exceeded, a high load for aberration compensation is imposed on the relay lens sub-system.

Axial light rays pass through the front lens group of the relay lens system (i.e., the fourth lens group a) at a high level of the lenses. Above the upper limit of Condition (4), it is, therefore, difficult to compensate for spherical aberration, whereas below the lower limit thereof, the lens system must be lengthened which works against miniaturization.

Non-axial light rays pass through the rear lens group of the relay lens system (i.e., the fourth lens group b) at a high level of the lenses. Therefore, above the upper limit of Condition 5, it is difficult to compensate for coma aberration in addition to the spherical aberration, whereas below the lower limit, the lens system is enlarged.

Condition (6) co-acts with Condition (2). Below the lower limit, the curvature of field is excessive on the wide angle side. If the variation of the curvature of field is made too small, the overall length of the lens system must be lengthened.

Condition (7) co-acts with Condition (4). Below the lower limit, the positive lens surface has an excessive refractive power. As a result, it is difficult to compensate for spherical aberration. The same is also true of Condition (10) as described below. Above the upper limit thereof, the lens system is lengthened.

Condition (8) is required to well balance the aberrations by separating by a predetermined length the front and rear lens groups of the relay lens system. When the upper limit is exceeded, the lens diameters of the lenses of the rear lens group are increased. Inversely, when the lens diameters of the lenses of rear lens group are made too small, the diameters of the lens of the front lens group must be increased so as to obtain sufficient peripheral light. On the other hand, when the lower limit is exceeded, non-axial light rays pass the rear lens group at a high level of the relay lens system as described above concerning Condition (5). Therefore, the effect of the coma aberration compensation is reduced.

Condition (9) co-acts with Condition (5). Above the upper limit, though suitable for miniaturization, spherical aberration tends to be too low and it is difficult to compensate for spherical aberration with the final negative meniscus lens. Below the lower limit, the overall lens system is lengthened.

Condition (10) co-acts with Condition (7). Below the lower limit, the negative lens surface has an excessive refractive power. Spherical aberration and astigmatism are excessively compensated for. Above the upper limit, the compensation for spherical aberration, coma aberration and astigmatism generated up to the fourth lens group a is deficient.

Condition (11) relates to the curvature of field. Below the lower limit, the radius of curvature noted in Condition (10) must be a value exceeding the lower limit thereof so as to maintain the effect of the final negative meniscus lens. As a result, the Petzval's sum tends to be negative and it is therefore difficult to compensate for the curvature of field.

An Example of a zoom lens of the invention will now be described in the following table in which f is the overall focal length, $\omega$ is the half viewing angle of the designated lens, r is the radius of curvature, d is the lens thickness of distance between adjacent lenses, N is the refractive index at the d-line, and $\nu$ is the Abbe number.

| F No. 1:4.5 | f = 82.0 ~ 195.0 | $\omega$ = 15.2° ~ 6.2° | | |
|---|---|---|---|---|
| LENS NO. | r | d | N | $\nu$ |
| FIRST LENS GROUP | 1 | 87.373 | 3.95 | 1.51633 | 64.1 |
| | 2 | 284.393 | 0.10 | | |
| | 3 | 69.120 | 2.30 | 1.80518 | 25.4 |
| | 4 | 46.684 | 8.05 | 1.48749 | 70.1 |
| | 5 | −1885.831 | 4.409 | | |
| SECOND LENS GROUP | 6 | −161.880 | 1.70 | 1.69680 | 55.5 |
| | 7 | 46.010 | 4.45 | | |
| | 8 | −60.000 | 1.50 | 1.69680 | 55.5 |
| | 9 | 40.111 | 3.80 | 1.80518 | 25.4 |
| | 10 | −1590.000 | 30.980 | | |
| THIRD LENS GROUP | 11 | 114.300 | 5.00 | 1.58913 | 61.0 |
| | 12 | −42.520 | 1.60 | 1.80518 | 25.4 |
| | 13 | −83.000 | 11.897 | | |
| FOURTH LENS GROUP a | 14 | 39.214 | 4.10 | 1.58913 | 61.0 |
| | 15 | −2275.000 | 1.79 | | |
| | 16 | −269.221 | 2.10 | 1.80518 | 25.4 |
| | 17 | 269.221 | 32.87 | | |
| FOURTH LENS GROUP b | 18 | 71.700 | 3.50 | 1.62588 | 35.7 |
| | 19 | −265.000 | 8.45 | | |
| | 20 | −30.398 | 1.70 | 1.80610 | 40.9 |
| | 21 | −79.717 | | | |

Variable                f

-continued

| Distance | 82.0 | 135.0 | 195.0 |
|---|---|---|---|
| $d_5$ | 4.409 | 26.751 | 37.624 |
| $d_{10}$ | 30.980 | 17.429 | 1.718 |
| $d_{13}$ | 11.897 | 3.105 | 7.943 |

$f_{min}/f_I = 0.759$,
$f_{min}/f_{I\sim II} = -1.246$,
$f_{min}/f_{I\sim III} = -0.085$,
$f_{min}/f_{I\sim IVa} = 1.088$,
$f_{min}/f_{I\sim IVb1} = 1.920$,
$(n_{II1} + n_{II2})/2 = 1.6968$,
$r_{IVa1}/f_{min} = r_{14}/f_{min} = 0.478$,
$l_{IVaIVb}/f_{min} = d_{17}/f_{min} = 0.401$,
$l_{IVb2}/f_{min} = d_{19}/f_{min} = 0.103$,
$|r_{IVb3}|/f_{min} = |r_{20}|/f_{min} = 0.371$, and
$n_{IVb2} = 1.80610$.

What is claimed is:

1. A compact telephoto zoom lens comprising, in order from the object side, a variator system including a first lens group functioning as a focusing group having a positive focal length, a second lens group functioning as a main variator having a negative focal length, a third lens group functioning as a compensator for maintaining an image plane constant having a positive focal length, and a relay lens system, said first lens group including a positive meniscus lens convex on the object side and a positive cemented lens comprising a negative meniscus lens convex on the object side and a positive lens, said second lens group including a negative lens whose lens concave surfaces confront each other and a negative cemented lens comprising a biconcave lens and a positive lens, said third lens group including a positive cemented lens composed of a biconvex lens and a negative meniscus lens, said relay lens system including a fourth lens group a comprising a positive lens having a stronger convex surface on the object side and a biconcave negative lens and a fourth lens group b comprising a biconvex positive lens and a negative meniscus lens having a stronger concave surface on the object side, said fourth lens group b being disposed a predetermined distance from said fourth lens group a, said zoom lens satisfying the following conditions:

F No. 1:4.5   f = 82.0 ~ 195.0   ω = 15.2° ~ 6.2°

| LENS NO. | r | d | N | ν |
|---|---|---|---|---|
| FIRST LENS GROUP | 1 | 87.373 | 3.95 | 1.51633 | 64.1 |
| | 2 | 284.393 | 0.10 | | |
| | 3 | 69.120 | 2.30 | 1.80518 | 25.4 |
| | 4 | 46.684 | 8.05 | 1.48749 | 70.1 |
| | 5 | −1885.831 | 4.409 | | |
| SECOND LENS GROUP | 6 | −161.880 | 1.70 | 1.69680 | 55.5 |
| | 7 | 46.010 | 4.45 | | |
| | 8 | −60.000 | 1.50 | 1.69680 | 55.5 |
| | 9 | 40.111 | 3.80 | 1.80518 | 25.4 |
| | 10 | −1590.000 | 30.980 | | |
| THIRD LENS GROUP | 11 | 114.300 | 5.00 | 1.58913 | 61.0 |
| | 12 | −42.520 | 1.60 | 1.80518 | 25.4 |
| | 13 | −83.000 | 11.897 | | |
| FOURTH LENS GROUP a | 14 | 39.214 | 4.10 | 1.58913 | 61.0 |
| | 15 | −2275.000 | 1.79 | | |
| | 16 | −269.221 | 2.10 | 1.80518 | 25.4 |
| | 17 | 269.221 | 32.87 | | |
| FOURTH LENS GROUP b | 18 | 71.700 | 3.50 | 1.62588 | 35.7 |
| | 19 | −265.000 | 8.45 | | |
| | 20 | −30.398 | 1.70 | 1.80610 | 40.9 |
| | 21 | −79.717 | | | |

| Variable Distance | f | | |
|---|---|---|---|
| | 82.0 | 135.0 | 195.0 |
| $d_5$ | 4.409 | 26.751 | 37.624 |
| $d_{10}$ | 30.980 | 17.429 | 1.718 |
| $d_{13}$ | 11.897 | 3.105 | 7.943 |

$f_{min}/f_I = 0.759$,
$f_{min}/f_{I\sim II} = -1.246$,
$f_{min}/f_{I\sim III} = -0.085$,
$f_{min}/f_{I\sim IVa} = 1.088$,
$f_{min}/f_{I\sim IVb1} = 1.920$,
$(n_{II1} + n_{II2})/2 = 1.6968$,
$r_{IVa1}/f_{min} = r_{14}/f_{min} = 0.478$,
$l_{IVaIVb}/f_{min} = d_{17}/f_{min} = 0.401$,
$l_{IVb2}/f_{min} = d_{19}/f_{min} = 0.103$,
$|r_{IVb3}|/f_{min} = |r_{20}|/f_{min} = 0.371$, and
$n_{IVb2} = 1.80610$.

where:
$f_{min}$ is the overall focal length of said zoom lens at a wide angle position thereof;
$f_I$ is the focal length of said first lens group;
$f_{I\sim II}$ is the resultant focal length of said first and second lens groups at said wide angle position;
$f_{I\sim III}$ is the resultant focal length of said first, second and third lens groups at said wide angle position;
$f_{I\sim IVa}$ is the resultant focal length from said first lens group to said fourth lens group a at said wide angle position;
$f_{I\sim IVb1}$ is the resultant focal length from said first lens group to said positive lens of said fourth lens group b at said wide angle position;
$n_{II1}$ is the refractive index of said first negative lens of said second lens group at the d-line thereof;
$n_{II2}$ is the refractive index of said second negative lens of said second lens group at the d-line thereof;
$r_{IVa1}$ is the radius of curvature of the first lens surface of said fourth lens group a;
$l_{IVaIVb}$ is the distance between said fourth lens groups a and b;
$l_{IVb2}$ is the distance between said positive lens and said negative meniscus lens of said fourth lens group b;
$r_{IVb3}$ is the radius of curvature of the first lens surface of said negative meniscus lens of said fourth lens group b;
$n_{IVb2}$ is the refractive index of said negative meniscus lens of said fourth lens group b at the d-line thereof;
f is the overall focal length;
ω is the half viewing angle of the designated lens;
r is the radius of curvature of the designated lens;
d is the lens thickness or distance between adjacent lenses;
N is the refractive index at the d-line; and
ν is the Abbe number.

2. A compact telephoto zoom lens comprising, in order from the object side, a variator system including a first lens group functioning as a focusing group having a positive focal length, a second lens group functioning as a main variator having a negative focal length, a third lens group functioning as a compensator for maintaining an image plane constant having a positive focal length, and a relay lens system, said first lens group including a positive meniscus lens convex on the object side and a positive cemented lens comprising a negative meniscus lens convex on the object side and positive lens, said second lens group including a negative lens whose lens concave surfaces confront each other and a negative cemented lens comprising a biconcave lens and a positive lens, said third lens group including a positive cemented lens composed of a biconvex lens and a negative meniscus lens, said relay lens system including a fourth lens group a comprising a positive lens having a stronger convex surface on the object side and a biconcave negative lens and a fourth lens group b comprising a biconvex positive lens and a negative meniscus lens having a stronger concave surface on the object side, said fourth lens group b being disposed a predetermined distance from said fourth lens group a, said zoom lens satisfying the following conditions:

$$0.5 < \frac{f_{min}}{f_I} < 1.0, \tag{1}$$

$$-1.5 < \frac{f_{min}}{f_{I \sim II}} < -1.0, \tag{2}$$

$$-0.25 < \frac{f_{min}}{f_{I \sim III}} < 0.15, \tag{3}$$

$$0.8 < \frac{f_{min}}{f_{I \sim IVa}} < 1.25, \tag{4}$$

$$1.5 < \frac{f_{min}}{f_{I \sim IVb1}} < 2.3, \tag{5}$$

$$1.60 < \frac{n_{II1} + n_{II2}}{2}, \tag{6}$$

$$0.35 < \frac{r_{IVa1}}{f_{min}} < 1.0, \tag{7}$$

$$0.25 < \frac{l_{IVaIVb}}{f_{min}} < 0.6, \tag{8}$$

$$0.05 < \frac{l_{IVb2}}{f_{min}} < 0.2, \tag{9}$$

$$0.25 < \frac{|r_{IVb3}|}{f_{min}} < 0.7 \ (r_{IVb3} < 0), \text{ and} \tag{10}$$

$$1.70 < n_{IVb2}. \tag{11}$$

where:
$f_{min}$ is the overall focal length at the wide angle end;
$f_I$ is the focal length of the first lens group;
$f_{I \sim II}$ is the resultant focal length of the first and second lens group at the wide angle end;
$f_{I \sim III}$ is the resultant focal length of the first, second and third lens groups at the wide angle end;
$f_{I \sim IVa}$ is the resultant focal length from the first lens group to the fourth lens group a at the wide angle end;
$f_{I \sim IVb1}$ is the resultant focal length from the first lens group to the positive lens of the fourth lens group b at the wide angle end;
$n_{II1}$ is the refractive index of the first negative lens of the second lens group at the d-line;
$n_{II2}$ is the refractive index of the second negative lens of the second lens group at the d-line;
$r_{IVa1}$ is the radius of curvature of the first lens surface of the fourth lens group a;
$l_{IVaIVb}$ is the distance between the fourth lens groups a and b;
$l_{IVb2}$ is the distance between the positive lens and the negative meniscus lens of the fourth lens group b;
$r_{IVb3}$ is the radius of curvature of the first surface of the negative meniscus lens of the fourth lens group b; and
$n_{IVb2}$ is the refractive index of the negative meniscus lens of the fourth lens group b at the d-line.

* * * * *